(12) United States Patent
Garcia

(10) Patent No.: US 6,691,480 B2
(45) Date of Patent: Feb. 17, 2004

(54) EMBOSSED-IN-REGISTER PANEL SYSTEM

(75) Inventor: Eugenio Cruz Garcia, Gandia (ES)

(73) Assignee: Faus Group, Dalton, GA (US)

( * ) Notice: Subject to any disclaimer, the term of this patent is extended or adjusted under 35 U.S.C. 154(b) by 0 days.

(21) Appl. No.: 10/137,319

(22) Filed: May 3, 2002

(65) Prior Publication Data

US 2003/0205012 A1 Nov. 6, 2003

(51) Int. Cl.[7] .............................................. E04C 1/00
(52) U.S. Cl. ........................ 52/313; 52/592.1; 52/592.2
(58) Field of Search ............................... 52/313, 592.1, 52/578–592.6, 311.1, 311.2, 311.3, 312, 314, 315, 316

(56) References Cited

U.S. PATENT DOCUMENTS

| | | | |
|---|---|---|---|
| 2,108,226 A | | 2/1938 | Johnston |
| 3,373,068 A | | 3/1968 | Grosheim et al. |
| 3,814,647 A | * | 6/1974 | Scher et al. |
| 3,878,030 A | * | 4/1975 | Cook |
| 4,062,992 A | * | 12/1977 | Power et al. .................. 428/90 |
| 4,118,533 A | * | 10/1978 | Hipchen et al. ............. 428/297 |
| 4,131,705 A | * | 12/1978 | Kubinsky .................... 428/106 |
| 4,284,453 A | * | 8/1981 | Endrizzi |
| 4,290,248 A | | 9/1981 | Kemerer et al. |
| 4,367,110 A | * | 1/1983 | Yoshikawa |
| 4,376,812 A | * | 3/1983 | West |
| 4,396,448 A | * | 8/1983 | Ohta et al. |
| 4,500,373 A | * | 2/1985 | Kubota ......................... 156/79 |
| 4,557,779 A | * | 12/1985 | Bower et al. ................ 156/219 |
| 4,585,685 A | * | 4/1986 | Forry et al. .................. 428/143 |
| 4,599,127 A | | 7/1986 | Cannady, Jr. et al. |
| 4,689,102 A | | 8/1987 | Prawdzik et al. |
| 4,864,790 A | | 9/1989 | Liardet |
| 5,136,823 A | * | 8/1992 | Pellegrino .................... 52/539 |
| 5,226,273 A | * | 7/1993 | Burke |
| 5,283,102 A | * | 2/1994 | Sweet et al. ................. 428/167 |
| 5,314,554 A | * | 5/1994 | Owens |
| 5,335,473 A | * | 8/1994 | Chase ....................... 52/745.08 |
| 5,413,834 A | * | 5/1995 | Hunter et al. |
| 5,437,934 A | * | 8/1995 | Witt et al. ................. 428/537.1 |
| 5,525,394 A | * | 6/1996 | Clark et al. .................. 428/105 |
| 5,570,554 A | * | 11/1996 | Searer .......................... 52/539 |
| 5,681,428 A | * | 10/1997 | Nakajima et al. ............ 162/117 |
| 5,713,173 A | | 2/1998 | Von Langsdorff et al. |
| 5,723,221 A | * | 3/1998 | Brooker et al. |
| 5,736,227 A | * | 4/1998 | Sweet et al. |
| 5,858,160 A | | 1/1999 | Piacente et al. |
| 5,961,903 A | | 10/1999 | Eby et al. |
| 6,032,425 A | * | 3/2000 | Gugliotti et al. |
| 6,101,778 A | * | 8/2000 | Martensson |
| 6,114,008 A | | 9/2000 | Eby et al. |
| 6,156,402 A | * | 12/2000 | Smith ......................... 428/40.1 |
| 6,182,410 B1 | * | 2/2001 | Pervan |
| 6,224,698 B1 | * | 5/2001 | Endo ............................ 156/60 |
| 6,247,285 B1 | * | 6/2001 | Moebus ...................... 52/589.1 |
| 6,401,415 B1 | * | 6/2002 | Garcia |
| 6,421,970 B1 | * | 7/2002 | Martensson et al. ........ 52/282.1 |
| 2002/0160680 A1 | * | 10/2002 | Laurence et al. |

FOREIGN PATENT DOCUMENTS

| | | |
|---|---|---|
| EP | WO-97/31776 A1 | 9/1997 |
| EP | 1 153 736 A1 | 11/2001 |
| EP | 0 888 215 B1 | 6/2002 |
| EP | 1 225 033 A1 | 7/2002 |
| EP | 0 883 487 B1 | 10/2002 |
| ES | 163421 U | 5/1971 |
| ES | 460194 A | 5/1978 |
| ES | 283331 U | 5/1985 |
| ES | 1019585 U | 4/1992 |

* cited by examiner

*Primary Examiner*—Jeanette Chapman
(74) *Attorney, Agent, or Firm*—McKenna Long & Aldridge LLP

(57) ABSTRACT

Laminated materials having decorative motifs and surface textures that are mechanically embossed-in-registration, and that include locking mechanisms. Those locking mechanically are located such that they enable formation of embossed-in-register laminate systems in which the embossed-in-registration continues across connecting joints.

30 Claims, 10 Drawing Sheets

EMBOSSED-IN-REGISTER PANEL SYSTEM

BACKGROUND OF THE INVENTION

1. Field of the Invention

The present invention relates to laminated materials. More particularly, the present invention relates to interlocked laminated materials having decorative motifs and surface textures that are mechanically embossed in registration.

2. Discussion of the Related Art

Because of their look and feel, traditional building and finishing materials, such as fine woods, slate, granite, stones, brick, and concrete are generally preferred by consumers. However, such traditional building and finishing materials tend to be expensive to produce and to install. For example, while a solid wood floor has a highly valued luxury appearance, in practice the materials and labor required to install such floors can be prohibitively expensive.

There are many alternatives to traditional building and finishing materials, including laminates and high-pressure laminate boards (HPL). However, in general such alternatives do not possess the realistic look and texture of the traditional building and finishing materials. For example, most alternatives having an outer surface with a wood motif look fake, and thus can readily be identified as something other than traditional wood. Furthermore, while high quality HPL boards may visually look like wood, their textures readily reveal that they are not.

One problem with most alternatives to traditional building and finishing materials is that their surface textures do not match their decorative motifs. For example, a visual depiction of a wood knot does not match the surface texture characteristics of a wood knot. This significantly reduces the attractiveness of the alternative to consumers.

As an alternative to the traditional building and finishing materials it is known to mechanical emboss laminated materials to produce a surface texture, reference U.S. patent applications Ser. Nos. 09/903,807 and 09/460,117. Those applications are hereby incorporated by reference. Such methods produce embossed-in-register laminated materials having decorative motifs and matching high-quality three-dimensional textures. Embossed-in-register laminated materials require accurate registration of mechanical embossment and the decorative motif. An advantage of embossed-in-register laminated materials is that they can realistically reproduce the look and feel of traditional products.

Figure 1:
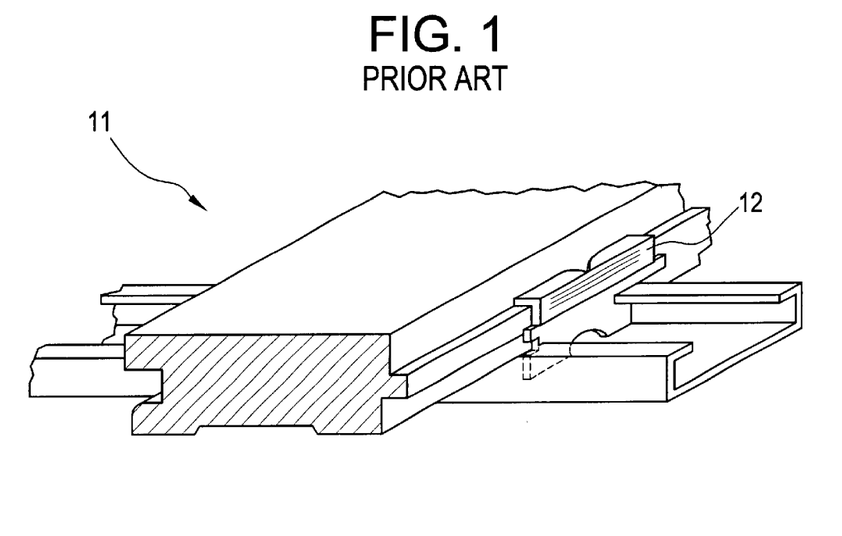
FIG. 1 is a prior art assembly and locking mechanism.

No matter what type of building product is used it is important that the product be easy to move to a work site and that the product can be easily and quickly installed. To this end it is known to incorporate assembly and locking mechanisms to aid on-site installation. One type of assembly and locking mechanism is the conventional tongue and groove system commonly used for connecting panels. Such tongue and groove systems are disclosed in Cherry, U.S. Pat. No. 2,057,135, and in Urbain, U.S. Pat. No. 2,046,593. For example, FIG. 1 illustrates a tongue and groove system 11 that uses clips 12 to secure panels together.

Figure 2:
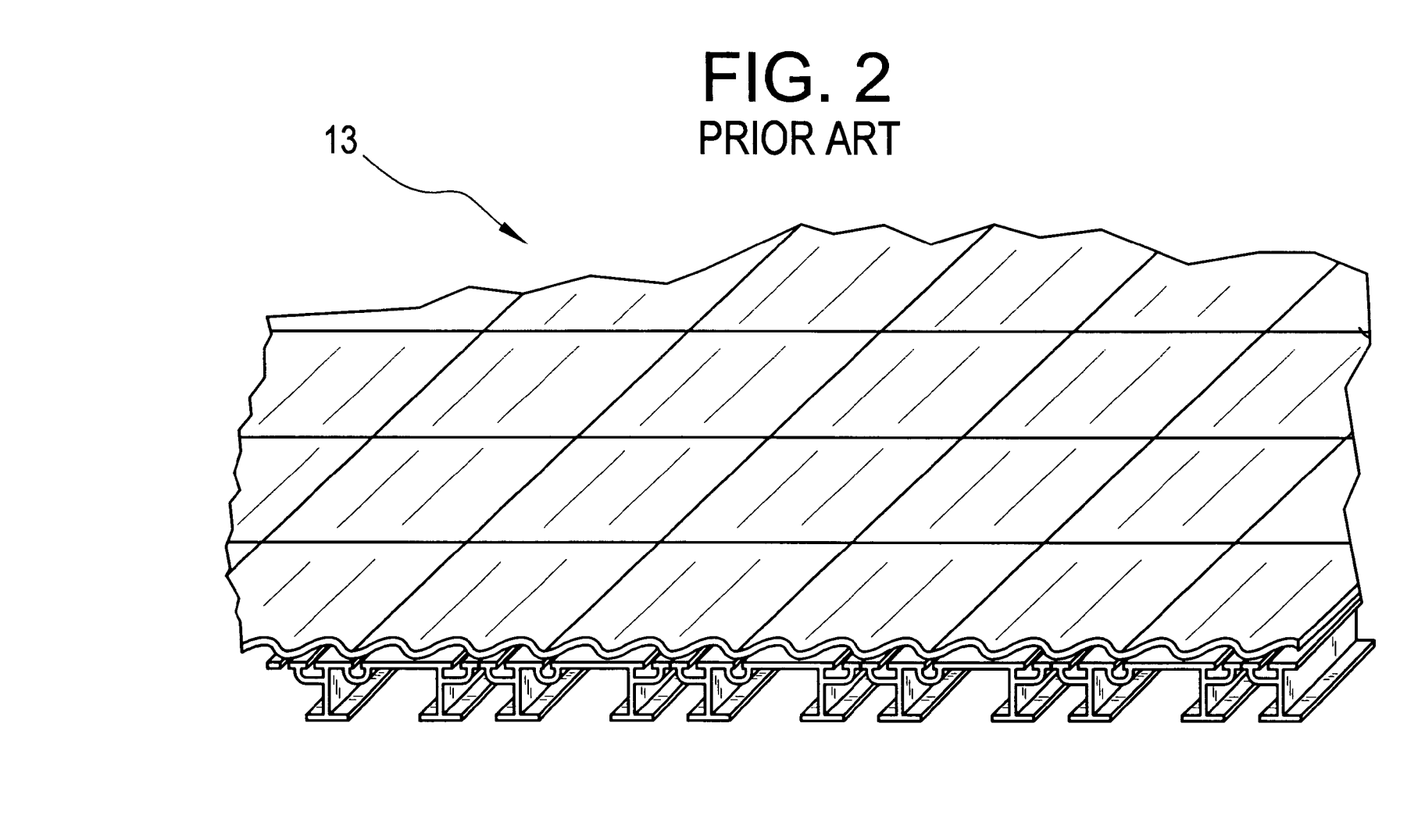
FIG. 2 is another prior art assembly and locking mechanism.

Another type of assembly and locking mechanism is disclosed in Chevaux, U.S. Pat. No. 3,976,529. In that approach, a flooring system 13 is connected using a tongue and groove system arranged underneath the flooring, reference FIG. 2.

Figure 3:
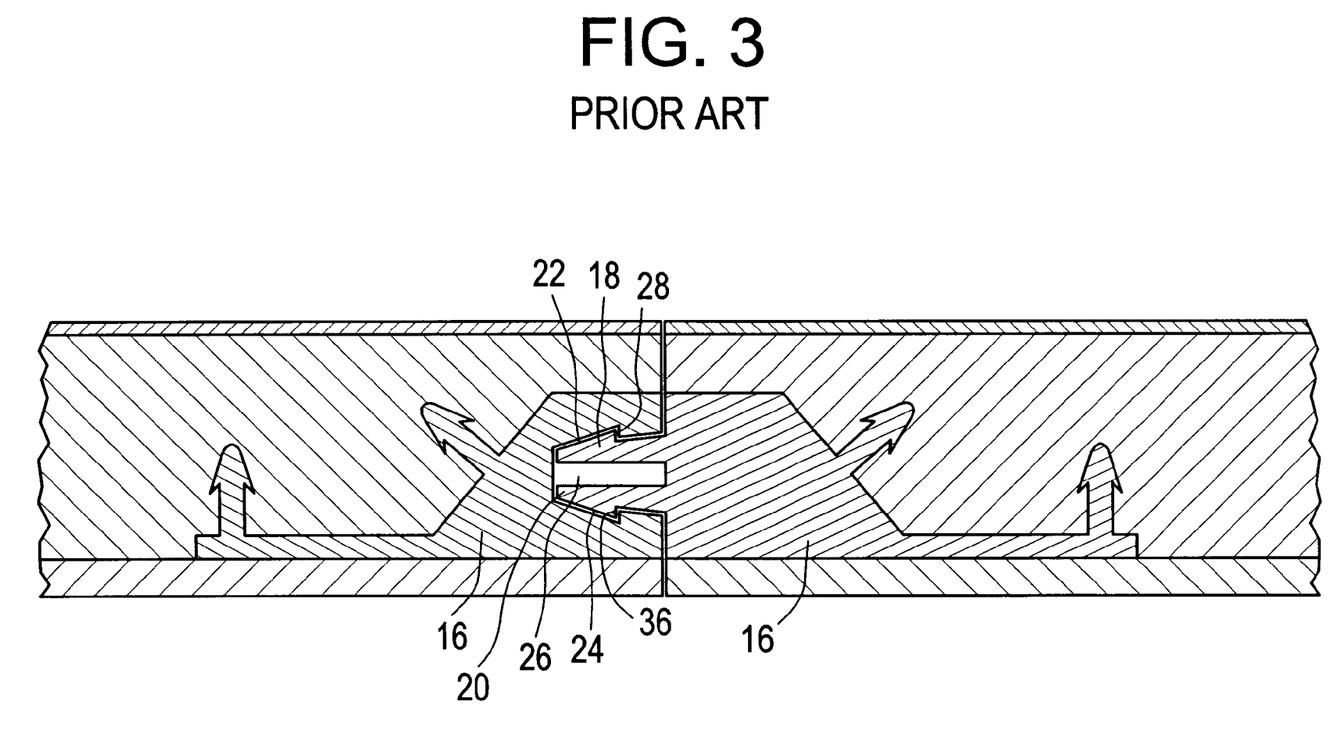
FIG. 3 is another prior art assembly and locking mechanism.

Still another assembly and locking mechanism is taught in Kajiwara, U.S. Pat. No. 5,295,341. There, laminated boards are provided with a snap-together system such as a groove-tongue joint. As a result the laminated boards can be assembled without glue. Referring to FIG. 3, the laminated boards are provided with a locking means in the form of a groove connector 16, and a tongue connector 18. The groove connector 16 has forwardly protruding grooves 20, while the tongue 18 is provided with a pair of forwardly diverging sidewalls 22 and 24 that are separated by an elongated groove 26. The sidewalls include rear locking surfaces 28 and 36. The sidewalls can be compressed together to enable locking.

Figure 4:
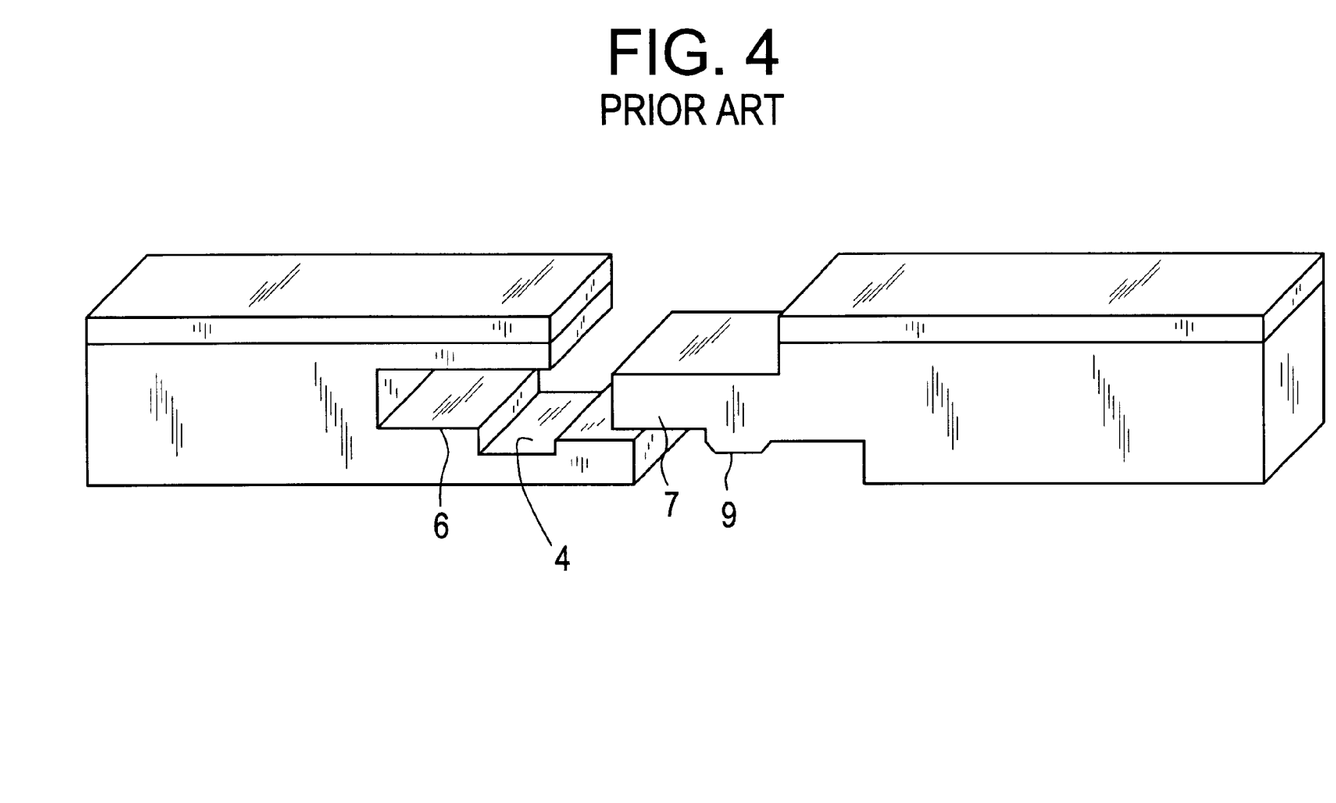
FIG. 4 is yet another assembly and locking mechanism.

Another type of assembly-and locking mechanism is the snap-together joint disclosed in Martensson, U.S. Pat. No. 6,101,778. As shown in FIG. 4, laminated boards are provided with a locking means comprised of a groove 6 and a tongue 7 that form a tongue-groove assembly. The groove 6 and tongue 7 may be made of water tight material and snapped together with a portion 9 fitting in a slot 4.

While the prior art assembly and locking mechanisms have proven useful, they have not been used with embossed-in-register laminate systems in which embossed-in-register decorative motifs or graphics align across joints between the individual embossed-in-register laminates. This significantly detracts from the visual and textural impression of systems comprised of embossed-in-register laminate boards. Therefore, a new embossed-in-register laminate system in which the visual and textural patterns cross joints while retaining the embossed-in-register aspects would be beneficial. Even more beneficial would be an embossed-in-register laminate system comprised of interlocking embossed-in-register laminate boards in which the visual and textural patterns cross joints while retaining embossed-in-register aspects would be beneficial.

SUMMARY OF THE INVENTION

Accordingly, the principles of the present invention are directed to embossed-in-registered laminate systems that overcome one or more of the limitations and disadvantages of the prior art. In particular, the principles of the present invention provide for embossed-in-registered laminate systems in which embossed-in-register decorative motifs or graphics align across joints between individual embossed-in-registered laminates. Such enables a more realistic flooring or panel system and solves one or more of the problems of the prior art.

The principles of the present invention further provide for embossed-in-registered laminate systems in which interlocked embossed-in-register laminates havet decorative motifs or graphics hat align across joints between individual embossed-in-registered laminates. Such enables a more realistic flooring or panel system and solves one or more of the problems of the prior art.

The principles of the present invention further provide for embossed-in-registered laminates such that when the embossed-in-registered laminates are arranged into an embossed-in-registered laminate system in which the decorative motifs align across joints to form continuous patterns.

To achieve these and other advantages, and in accord with the purposes of the present invention, as embodied and broadly described, an embossed-in-registration laminate system comprising a first board having a first embossed-in-register pattern and a first locking part; and a second board having a second embossed-in-register pattern and a second locking part; wherein said first and second boards can be arranged together such that said first and second locking parts securely join said first and second boards together into an embossed-in-register board system. Beneficially, the first and second boards join-such that the first and second embossed-in-register patterns form an embossed-in-register system pattern that crosses a joint between the first and second boards.

In another aspect of the present invention, a first board having an embossed-in-register tile decorative motiff and a first locking part, and a second board having an embossed-in-register tile decorative motiff and a second locking part form an embossed-in-registered board system in which the first and second locking parts are mated and in which the tile decorative motif continues uninterrupted across the mating joint. Beneficially, the separation between tile decorative motifs in a first direction is substantially the same as the separation between tiles decorative motifs in a second direction. Furthermore, the separation between tiles decorative motifs across the mating joint is substantially the same as the separation between decorative motifs in the first direction.

In another aspect of the present invention, a first board having an embossed-in-register wood grain decorative motiff and a first locking part, and a second board having an embossed-in-register wood grain decorative motiff and a second locking part form an embossed-in-registered board system in which the first and second locking parts are mated and in which the wood grain decorative motif continues uninterrupted across the mating joint.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

The principles of the present invention are incorporated in a subsequently described embossed-in-registration laminate system. However, it should be appreciated that while the illustrated embodiment is suitable for implementing embossed-in-registered laminate products, others who are skilled in the applicable arts will recognize numerous alternatives and variations. Therefore, the present invention is intended to extend to all alternatives and variations that come under the broad terms of the claims that follow.

Figure 5:
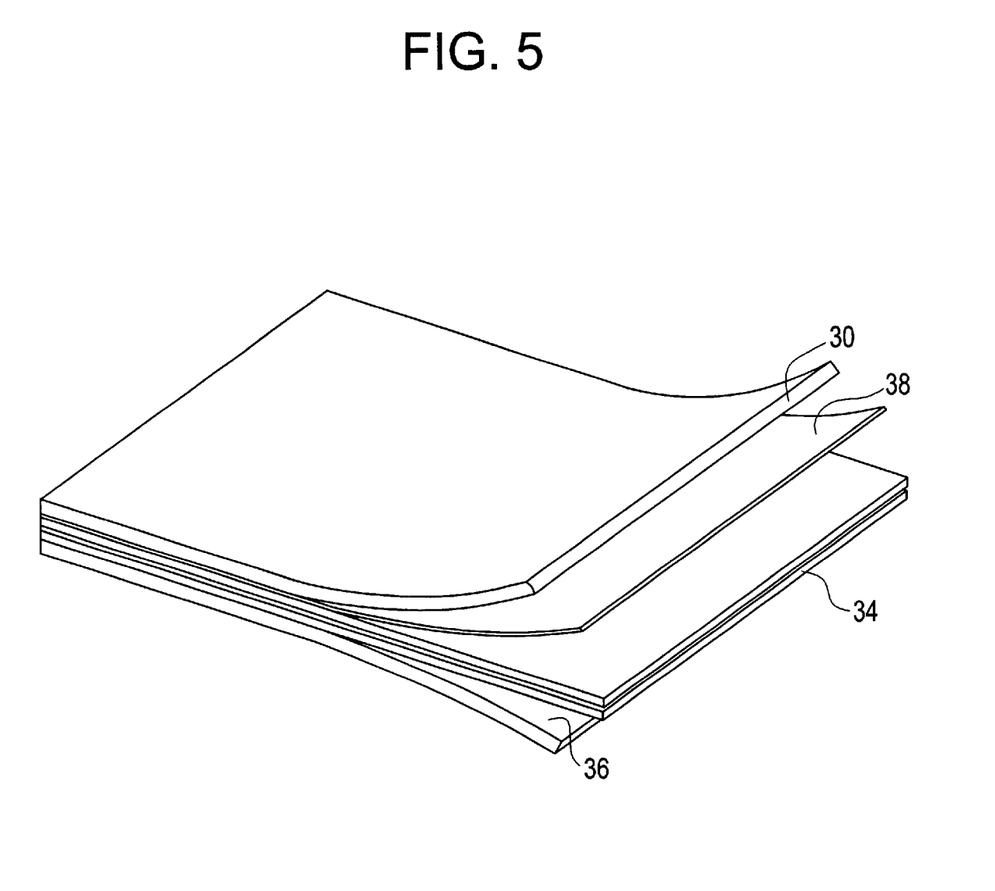
FIG. 5 is a schematic perspective view an embossed-in-register laminate suitable for use with the principles of the present invention.

Laminate products are well known. Turn now to FIG. 5 for a depiction of components of a direct pressure laminate product. Such products are typically fabricated from a base board 34, beneficially a medium or high density fiberboard or chipboard. One or more kraft paper sheets 36 (for clarity, FIG. 5 shows only one kraft paper sheet) impregnated with selected resins are located on and/or under the base board 34. A decorative cellulose paper sheet 38, about 0.15 mm thick and impregnated with a melamine solution, is on the base board 34. Over the decorative cellulose paper sheet 38 are one or more protective overlay sheets 30. The protective overlay sheet(s) are made of a highly resistant paper having corundum ($AL_2O_3$) impregnated in a melamine solution. It is also possible to include different papers between the decorative cellulose paper sheet and the base board.

The structure of FIG. 5 is then pressed under heat (180–220° C.) and pressure (approximately 20–30 $Kg/cm^2$) until the resins thermnoset. The result is an extremely hard and permanent product.

Figure 6:
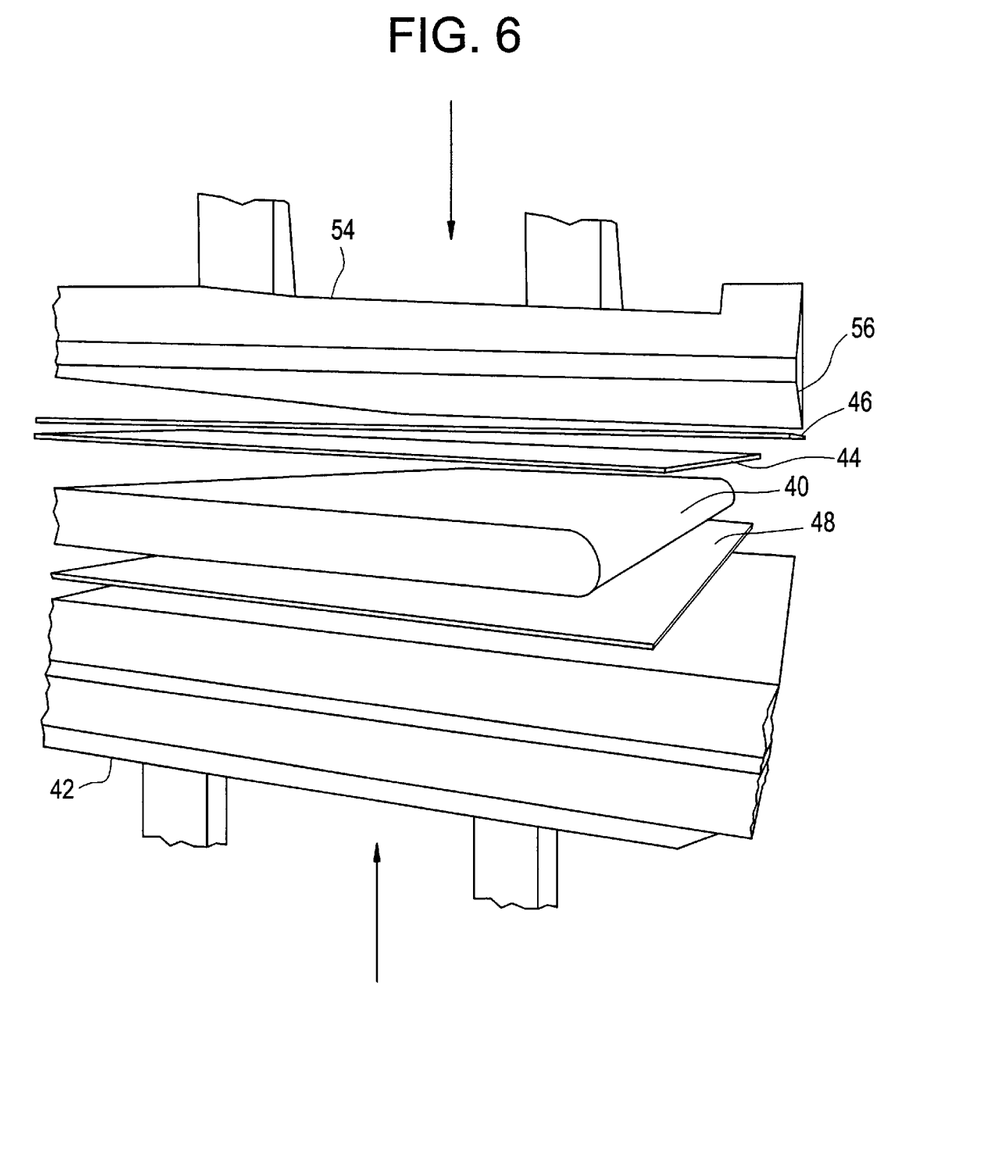
FIG. 6 illustrates an embossed-in-registration laminate fabrication system.

The present invention relates to improved laminates that include locking mechanisms and surface textures that are registered with decorative motifs on paper sheets. To produce such laminates, a press machine, such as that illustrated in FIG. 6, is used to produce the surface texture. With reference to that figure, to produce a direct pressure laminate a board substrate 40, a melamine resin soaked decorative paper sheet 44, and one or more protective overlay sheets 46 (and possibly other sheets such as a base sheet 48) are accurately located in a press machine. The press machine includes a base 42, a top press 54, and a press plate 56. that includes a three-dimensional surface (not shown). Significantly, the press plate's surface includes ridges and/or depressions that align with a decorative motif on the decorative paper sheet 44. The board substrate 40, the decorative paper sheet 44, and the protective overlay sheet 46 (and the base sheet 48, if present) are then heated at about 160–220° C. and pressed together at about 20–40 $Kg/cm^2$ for about 20 to 60 seconds. This cures the melamine and forms an embossed-in-register laminate.

Figure 7:
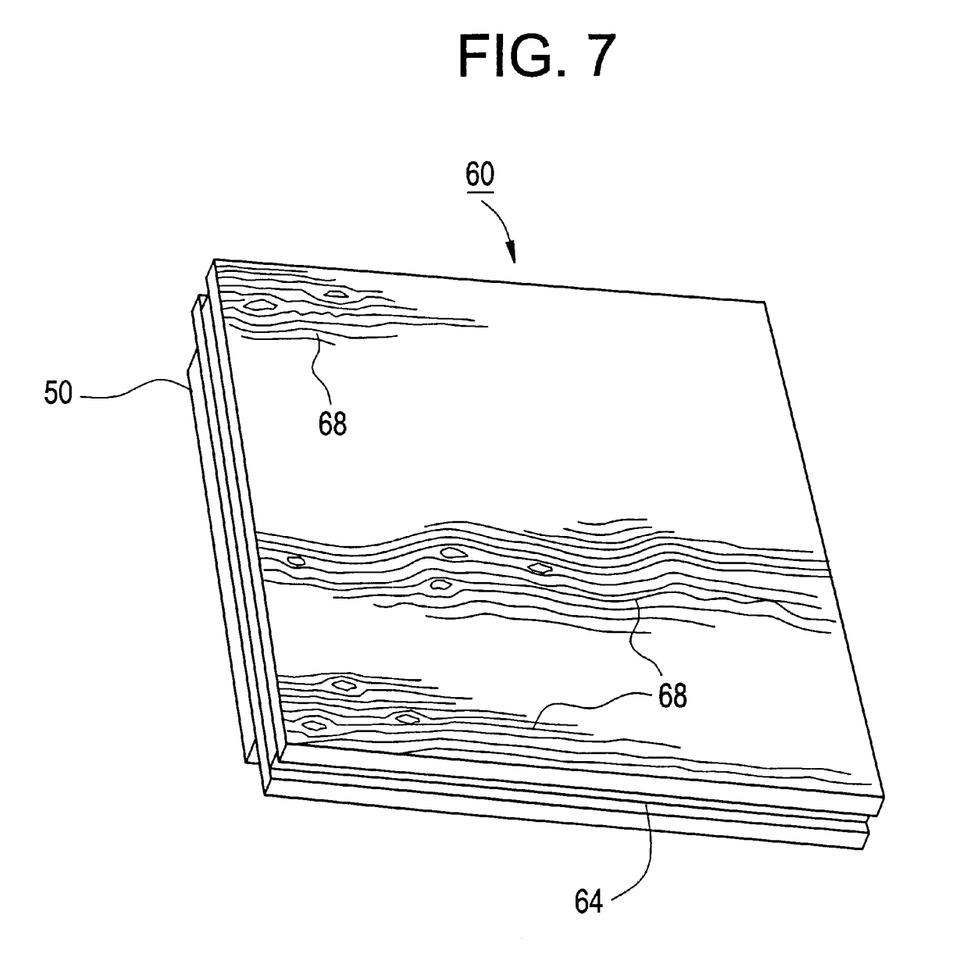
FIG. 7 is an embossed-in-registration laminate that is in accord with the present invention.

Turning now to FIG. 7, the resulting embossed-in-register laminate 60 has a surface texture, embossed by the press plate 56, that is registered with a decorative motif 68 on the decorative paper sheet 44. By registration it is meant that the embossed texture coincides with or matches that of the decorative motif of the decorative paper sheet 44. This can provide a realistic imitation of a natural material.

The various sheets shown in FIG. 6 are similar to those of laminate sheets shown in FIG. 5, but the sheets of FIG. 6 have tightly controlled parameters, as is discussed subsequently. The board substrate 40 can be a medium density or high density fiberboard, such as chipboard, or the like. Prior to going into the press machine, the decorative paper sheet 44, the one or more protective overlay sheets 46, and the base sheet 48 (if used) are positioned on the board substrate 40. Beneficially, those sheets are attached to the board substrate using static electricity. Furthermore, the protective overlay sheets 46, and the base sheet 48 can be impregnated with a resin, which need not be the same melamine resin used to impregnate the decorative paper sheet 44.

While the foregoing generally describes pressing and heating when fabricating embossed-in-registration laminates, additional knowledge may be helpful As discussed in U.S. patent applications Ser. Nos. 09/903,807 and 09/460,117, which are hereby incorporated by reference, process control techniques must be carefully implemented. For example, it is convenient to ensure that the paper comes from the same manufacturer. Further, that manufacturer should only use cellulose paste from one origin. The warehousing of the supplied paper before use is also important. In the warehouse, time, temperature, and humidity should be carefully controlled to help ensure a consistent paper. All resins (such as melamine) should also be carefully controlled. For example, it is convenient to ensure that the resins come from the same manufacturer.

Furthermore, the impregnation process itself should be carefully controlled. When dipping the paper into the melamine resin to impregnate the paper, the paper should undergo a constant, uniform melamine load. Furthermore, the impregnation machine band tension and band oscillations, which are very important to the final result, should be very precisely controlled. Repeatability and consistency are very important.

The tight control of the paper and resin described above is also important. In order to obtain a quality product an exact knowledge of the dimensions of the impregnated paper is required, since the texture of the decorative motif is embossed into impregnated paper. Once those dimensions are established, it is possible to emboss-in-register using a prefabricated press plate.

The press plate should be carefully designed such that the press plate has correct dimensions at the operating temperature. Because the press plate in the press machine during operation is hot, expansion occurs. Therefore, when the press plate is expanded, the press plate texture must match the decorative motif of the impregnated decorative paper. Accordingly, the dimensions of the decorative motif must compensate for the expansions of the press plate during operation or when it is hot.

The decorative motif information is provided to the press plate manufacturer, which then fabricates a press plate that is properly registered, when hot, with the decorative motif. This is extremely important in the alignment process discussed subsequently.

With a properly impregnated paper and a-properly-de.signed press plate it is possible to produce embossed-in-registration laminates. However, locating the impregnated decorative paper sheet 44 on the board substrate 40 relative to the press plate must be done very accurately to enable a high quality embossed-in-registration result.

Specifically, consideration should be given to the fact that when the press is in a locked position and the board is under pressure, that coincidence between the structure of the press plate and the paper decorative motif is ensured. Depending on the type of decorative motif or graphic utilized the process may require a higher degree of control. For example, alignment of a wood grain motif across the joints of two adjacent embossed-in-registration laminates requires a higher degree of control. As compared to the alignment across the joints of two adjacent embossed-in-registration laminates with a ceramic tile motif, as discussed subsequently.

Coincidence between the decorative motif or graphic and the press plate is achieved using the following general processes. The entire board substrate 40 is milled by removing 2 or 3 millimeters from each edge. This milling produces several reference planes (the board edges) and a board having tightly controlled dimensions. Then, an impregnated decorative paper sheet 44 having an exterior dimension that is 8 or 10 mm smaller than the board substrate 40 is carefully located on the board substrate 40 using a locating system that may use edges of the board as references. In the alternative, reference marks may be placed on the substrate 40 to enable alignment with marks on the decorative paper sheet 44.

The decorative paper sheet 44 is beneficially attached to the board substrate 40 using static electricity. This avoids relative displacements as the board substrate 40 advances along the production line. Furthermore, the protective overlay sheet 46 (and possibly a base sheet 48) is attached to the board substrate 40.

The decorative paper sheet 44 and board substrate 40 are then located on a carriage that feeds into the press machine. As the carriage advances into the press machine, beneficially it stops and positions the decorative paper sheet 44 over the board substrate 40 using tweezers. The tweezers gently lay the decorative paper sheet 44 over the board substrate 40 structure and on the lower press plate. Then, the carriage moves out of the press machine.

After the decorative paper sheet 44 and the board substrate 40 are arranged on the lower press plate. A locating system accurately locates and positions the decorative paper 44 on the board substrate 40 such that the decorative paper aligns with recesses in the upper press plate 56. This locating system beneficially uses the milled reference edges of the board substrate 40 in order to position the decorative motif 44 relative to the press plate 56. After the alignment has occurred the press machine is then operated. At this point the interior of the press machine is heated to its operating temperature, and the top press 54 presses the upper press plate 56 into the decorative paper sheet 44 and board substrate 40 structure, fusing it into one piece. The locating system ensures that alignment of the decorative paper sheet 44 and the recesses in the press plate 56 occurs. In addition, if these alignment techniques are used in manufacturing multiple embossed-in-registration laminates, then when two adjacent embossed-in-registration laminates made from these techniques are joined together, a continuous decorative motif across the joints of the embossed-in-registration laminates occurs.

While the embossed-in-registration process described above is suitable for embossed surface textures that are less than about 0.2 mm deep, deeper surface textures can cause a problem. The problem is that deep surface textures, which require relatively large press plate protrusions, tend to disturb the pressure homogeneity across the board surface. This can lead to distortions and inaccuracies in the final product. A solution to that problem is to first hollow out the board's surface where deep surface textures are to be located. Of course, accurately locating the hollowed out portions can be important. This hollowing out process can be done in the pressing line at the same time as the milling of the perimeter described above. Beneficially, using the reference edges to locate the hollowed out portions. Alternatively, hollowing can be done on a different line.

An embodiment of the principles of the present invention is shown in FIG. 7. As shown an embossed-in-registration laminate 60 beneficially has a surface texture that is less than about 0.2 mm deep (as deeper surface textures may cause problems) and that is embossed by a pressure plate 56 in the fabrication process. The decorative motif may represent many different kinds of products, such as ceramic tiles, wood grain, concrete, and the like. By registration it is meant that the embossed texture coincides or matches with a visual image on the decorative paper sheet 44 inserted in the manufacturing process. The embossed-in-registration laminate 60 optionally may contain a protective padding 50 on one side.

Figure 8:
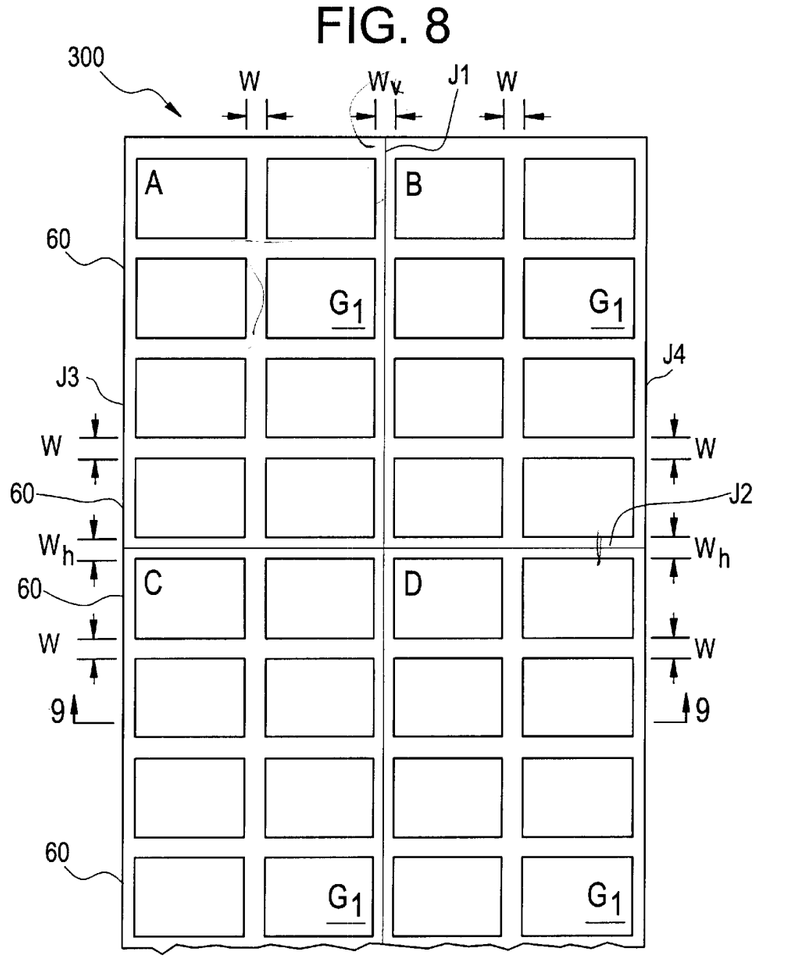
FIG. 8 is a top down view of an embossed-in-registration laminate system according to the present invention.

The embossed-in-registration laminate 60 beneficially includes a locking mechanism 64 that extends along all four sides of the embossed-in-registration laminate 60. The locking mechanism 64 may be a tongue and groove locking system, a snap-together locking system, or the like. For example, a snap-together locking system can be added to all four sides of the embossed-in-registration laminate 60 and utilized in connecting multiple embossed-in-registration laminates 60 into an embossed-in-registration laminate system 300, reference FIG. 8 (which depicts a tile motif rather than the wood grain motif of FIG. 7). The number and location of locking mechanisms may depend on the desired configuration of the embossed-in-registered laminate system. For example, when an embossed-in-registered laminate system abuts a corner, only two locking mechanisms are required (along the sides). In FIG. 8, the embossed-in-registration laminates A and B have locking mechanisms along three sides, that is a locking mechanism runs along joints J1, J2, J3, and J4. While the embossed-in-registration laminates C and D have locking mechanisms running along four sides, joints J1, J2, J3, and a joint that is not shown.

When utilizing some locking mechanisms, the embossed-in-registered laminates can be securely attached together without glue to form an embossed-in-registration laminate system 300. Multiple embossed-in-registration laminates can be joined together to obtain any desired shape for flooring, paneling, or the like. The embossed-in-registration laminates are beneficially joined such that the decorative motif is continuous across the joints of adjacent embossed-in-registration laminates.

Figure 9:
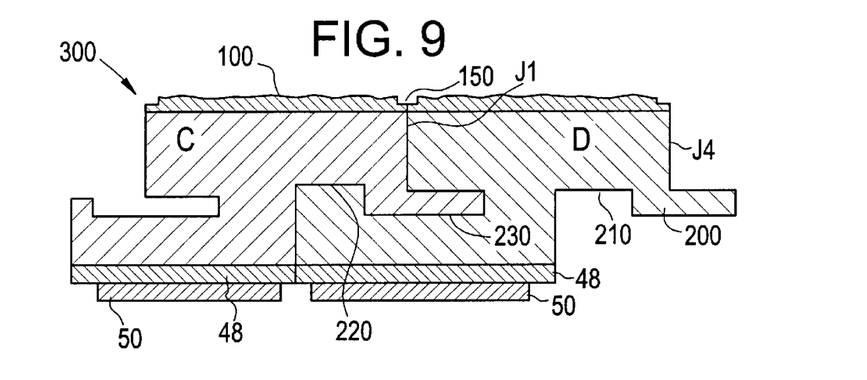
FIG. 9 is a cross-sectional view taken along line 9—9 of FIG. 8.

FIGS. 8 and 9 disclose an embossed-in-registration laminate system 300 that uses one type of locking mechanism on the individual embossed-in-registrater laminates 60. In FIG. 9, the locking mechanism is a snap-type tongue and groove system that is carefully fabricated into the sidewalls of each embossed-in-registration laminate 60 so as to ensure that when embossed-in-registration laminates 60 join to form the embossed-in-registration laminate system 300 that the decorative motif of each embossed-in-registration laminate 60 is continuous across the joints.

Fabrication of the locking mechanisms may be done prior to pressing the substrate 40 (reference FIG. 6) with the press plate. In the alternative, fabrication may be done after the embossed-in-registration laminate 60 is produced. In either case great care must be undertaken to ensure that the decorative motifs on individual embossed-in-registration laminates 60 align across the joints of the embossed-in-registration laminate system 300.

In one embodiment, locking mechanisms are fabricated into substrates 40 prior to the embossed-in-registration process. To do so, first, locking mechanisms are fabricated on individual substrates 40. Next, the individual substrates with the locking mechanisms are joined together to form a panel structure. That panel structure is then inserted into the press 54, reference FIG. 6 and its associated text. After embossing and removal from the press 54 the individual substrates 40 have embossed-in-registration patterns, thus forming embossed-in-registration laminates 60 that are still joined together by the locking mechanisms. Next, the embossed-in-registration laminates 60 are separated by unlocking the locking mechanisms. If required, cutting tools are utilized to assist separation to ensure that no damage occurs to the decorative motif.

In another embodiment, the locking mechanisms are fabricated after the decorative motifs or graphic patterns are formed. To do so, a large substrate, beneficially a 4'×8'base, in embossed by the press 54. Next, the resulting embossed-in-registration laminate substrate is highly accurately cut and formed to produce individual embossed-in-registration laminates 60 having accurately controlled dimensions and smooth edges. Cutting and forming is performed using shaping tools, milling tools, cutting tools, breaking tools, and the like. Careful alignment techniques are utilized to avoid negatively affecting the embossed-in-registration motif. Next, the locking mechanisms are formed on the individual embossed-in-registration laminates 60.

To form the locking mechanisms, the individual embossed-in-registration laminates 60 are carefully aligned relative to a shapping tool. Alignment can be performed either using the edges of the individual embossed-in-registration laminates 60 as reference planes, or by using alignment marks or patterns formed on the individual embossed-in-registration laminates 60. In either case, the locking mechanisms are carefully milled into the sides of the individual embossed-in-registration laminates 60. The use of these alignment techniques ensures that after the locking mechanisms have been fabricated, when the individual embossed-in-registration laminates with the locking mechanisms are arranged together the decorative motifs or graphics form a continuous pattern across the joints. Of course, this requires that decorative motifs or graphics, the cutting of the individual embossed-in-registration laminates 60, and the milling of the locking mechanisms are all carefully preplanned and carefully controlled to produce continuous patterns across the joints.

An alternative method is more direct, but slower. According to that method, individual embossed-in-registration laminates 60 are formed without being cut from a larger substrate. In that method, the locking mechanisms can be formed either prior to or subsequent to embossing.

The embossed-in-registration laminates 60 of FIG. 8 have been fabricated with a snap-type tongue and grove locking mechanism shown in FIG. 9 (which for clarity is not drawn to scale). FIG. 9 is a cross section of FIG. 8 taken along line 9—9. The locking mechanism is fabricated by producing a groove 230, a tongue 200, a channel 210 and a lip 220 that are formed along the edges of the embossed-in-registration laminates 60.

The locking mechanisms on the embossed-in-registration laminates 60 are joined together by inserting a tongue 200 into a groove 230 of an adjacent embossed-in-registered laminate 60. The lip 220 locks into place with a channel 210, thereby securely fastening the embossed-in-registration laminates 60 into an embossed-in-registration laminate system 300. The embossed-in-registration laminates 60 labeled A, B, C and D can be securely arranged together with or without glue. In the alternative, other types of locking mechanisms may be fabricated into the sides of the embossed-in-registration laminates 60. Optionally, each embossed-in-registration laminates 60 include a protective padding layer 50 on their bottom surface.

The embossed-in-registration laminates 60 of FIG. 8 have a ceramic tile motif G1. The ceramic tile motif comprises tiles in the shape of squares or rectangles that are separated by grout lines. The tiles may be of any design and dimension, for example, circles, ovals, special designs, and the like. Beneficially, the grout widths Wh, Wv, and the intraboard grout width W are substantially equal. When fabricating the snap-type tongue and groove locking mechanism into the embossed-in-registration laminates 60 the grout width adjacent the joints J1, J2, J3, and J4 on each embossed-in-registration laminate A, B, C, and D are approximately one-half the intraboard grout width W. Specifically, the vertical tile grout width (Wv) across joint J1 is made up of grout lines on embossed-in-registration laminates A, B, C and D, such that when the embossed-in-registration laminates A, B, C, and D are joined at J1 the vertical grout width (Wv) is approximately equal to (W). Beneficially, this requires the grout width on any individual embossed-in-registration laminate that is adjacent a joint to be one-half of intraboard grout width (W). Ultimately, the dimensions of the grout widths in the embossed-in-registration laminates depend on the type of locking mechanism utilized and the graphic motif that is used.

Figure 12:
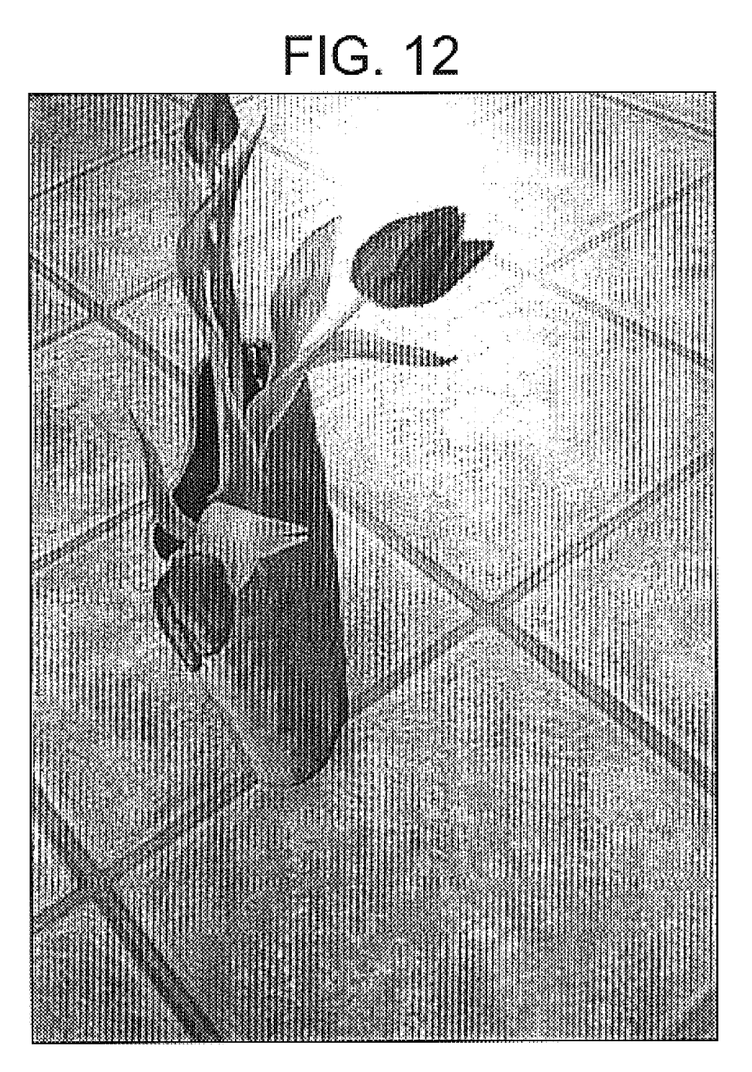
FIG. 12 is an embossed-in-registration laminate system that is in accord with the principles of the present invention.

By controlling the horizontal and vertical grout widths Wh and Wv to be substantially dimensions of the intraboard grout width W, a more realistic look and feel of the overall embossed-in-registration laminate system is achieved. Reference the embossed-in-registration laminate system shown in FIG. 12.

Figure 10:
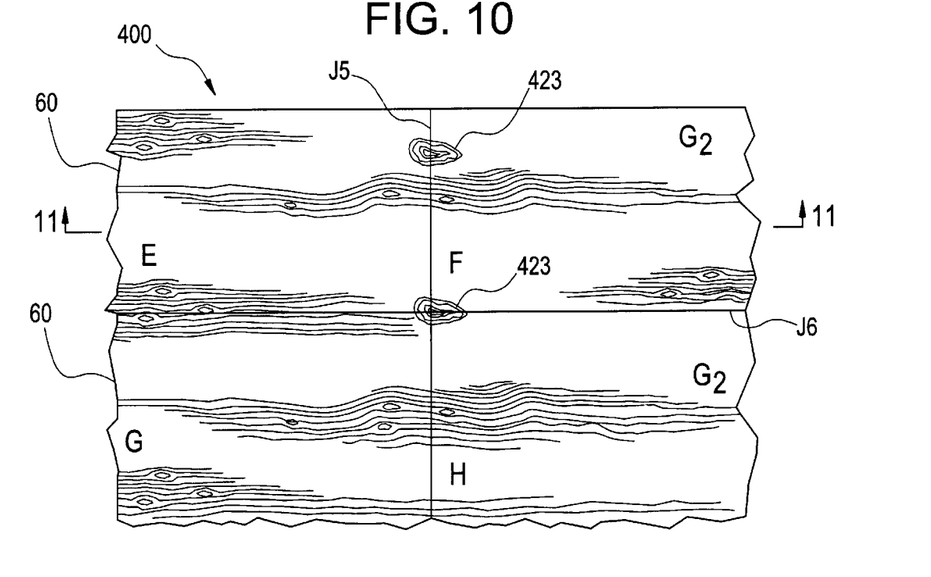
FIG. 10 is a top down view of another embossed-in-registration laminate system according to the present invention.
Figure 11:
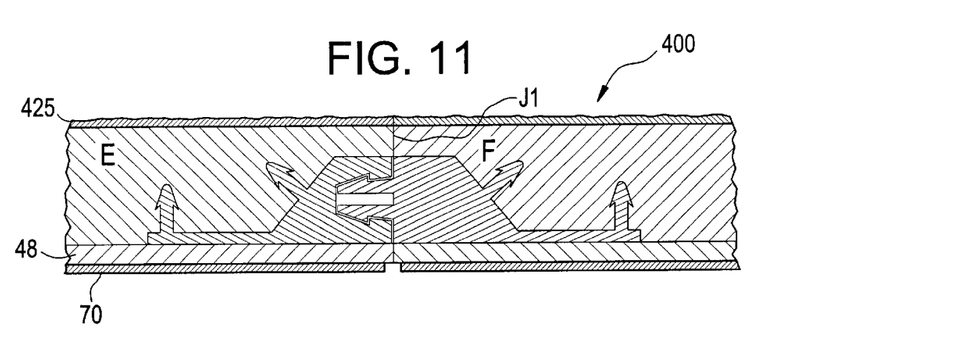
FIG. 11 is a cross-sectional view taken along line 11—11 of FIG. 10.

In addition to grout lines, many other graphics or motifs can be utilized in an embossed-in-registered laminate system. For example, FIGS. 10 and 11 depict a wood grain surface G2 that is continuous across joints J5 and J6. In order to align complex graphics such as the wood grain pattern across the joints, strong emphasis must be placed on the control systems and alignment techniques used in manufacturing the locking mechanisms. As a wood grain pattern has many more elements (e.g., wood grain lines and wood knot 423) to align than the ceramic tile motif, and as those elements extend all the way to the joints, matching wood grain patterns is more difficult than matching tile having grout lines. For example, matching a partial wood knot 423 on embossed-in-registration laminate E with a partial wood knot 423 on embossed-in-registration laminate F is more complex then matching grout lines widths across joints. Accordingly, when fabricating a locking mechanism, consideration of all the graphic elements (e.g., wood grains lines and wood knots 423) must be considered to ensure a realistic embossed-in-registration laminate system 400. However, the graphic elements can be used as reference alignment marks to ensure consistent matching of laminate after laminate.

100651 In another embodiment of the present invention, the embossed-in-registration laminate system 400 is connected with a snap-type mechanical system as shown in FIG. 11, which depicts a cross section of FIG. 10 along line 11—11. Again, alignment techniques are utilized in the fabrication of the locking mechanism such that the embossed-in-registration laminate system 400 has a surface texture surface 423 that is continuous across joints, J5 and J6. Optionally, the embossed-in-registration laminates 60 have a protective padding layer 70 under the base sheet 48.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An embossed-in-registration laminate system comprising:
   a plurality of embossed-in-registration laminates, each having a ceramic tile motif and a plurality of locking mechanisms;
   wherein said plurality of embossed-in-registration laminates lock together using said plurality of locking mechanisms to form an embossed-in-registration laminate system; and
   wherein said embossed-in-registration laminate system includes:
      intraboard grout lines having a width W;
      a vertical edge grout line, having a width Wv, that is comprised of a top grout line of a first embossed-in-registration laminate of said plurality of embossed-in-registration laminates and of a bottom edge grout line of a second embossed-in-registration laminate of said plurality of embossed-in-registration laminates; and
      a horizontal edge grout line, having a width Wh, that is comprised of a right grout line of a third embossed-in-registration laminate of said plurality of embossed-in-registration laminates and of a left edge grout line of a fourth embossed-in-registration laminate of said plurality of embossed-in-registration laminates.

2. The embossed-in-registration laminate system according to claim 1, wherein Wh, Wv and W are substantially equal.

3. The embossed-in-registration laminate system according to claim 1, wherein said first embossed-in-registration laminate includes a protective mat.

4. The embossed-in-registration laminate system according to claim 1, wherein said plurality of locking mechanisms comprise a tongue and groove system.

5. The embossed-in-registration laminate system according to claim 2, wherein said plurality of locking mechanisms comprise a snap-type system.

6. An embossed-in-registration laminate system comprising:
   a plurality of embossed-in-registration laminates, each having a plurality of locking mechanisms;
   wherein said plurality of embossed-in-registration laminates lock together using said plurality of locking mechanisms to form an embossed-in-registration laminate system; and
   wherein said embossed-in-registration laminate system includes:
      intraboard boundary lines having a width W;
      a vertical edge boundary line, having a width Wv, that is comprised of a top boundary line of a first embossed-in-registration laminate of said plurality of embossed-in-registration laminates and of a bottom edge boundary line of a second embossed-in-registration laminate of said plurality of embossed-in-registration laminates; and
      a horizontal edge boundary line, having a width Wh, that is comprised of a right boundary line of a third embossed-in-registration laminate of said plurality of embossed-in-registration laminates and of a left edge boundary line of a fourth embossed-in-registration laminate of said plurality of embossed-in-registration laminates.

7. The embossed-in-registration laminate system according to claim 6, wherein Wh, Wv and W are substantially equal.

8. The embossed-in-registration laminate system according to claim 6, wherein said first embossed-in-registration laminate includes a protective mat.

9. The embossed-in-registration laminate system according to claim 6, wherein said plurality of locking mechanisms comprise a tongue and groove system.

10. The embossed-in-registration laminate system according to claim 6, wherein said plurality of locking mechanisms comprise a snap-type system.

11. The embossed-in-registration laminate system according to claim 6, wherein at least two of the embossed-in-registration laminates are locked together and continue a pattern from one of the at least two of the embossed-in-registration laminates to another of the at least two of the embossed-in-registration laminates.

12. The embossed-in-registration laminate system according to claim 6, wherein said plurality of embossed-in-registration laminates have a ceramic tile motif.

13. The embossed-in-registration laminate system according to claim 11, wherein Wh, Wv and W are substantially equal.

14. The embossed-in-registration laminate system according to claim 11, wherein said first embossed-in-registration laminate includes a protective mat.

15. The embossed-in-registration laminate system according to claim 11, wherein said plurality of locking mechanisms comprise a tongue and groove system.

16. The embossed-in-registration laminate system according to claim 11, wherein said plurality of locking mechanisms comprise a snap-type system.

17. The embossed-in-registration laminate system according to claim 11, wherein the pattern is continued from both a design of the pattern and an embossed-in-registration of the pattern.

18. The embossed-in-registration laminate system according to claim 6, wherein more than two of the embossed-in-registration laminates are locked together and continue a pattern from one of the at least two of the embossed-in-registration laminates to another of the at least two of the embossed-in-registration laminates, wherein the more than two of the embossed-in-registration laminates each contribute in completing a pattern from both a design point of view and an embossed-in-registration point of view.

19. The embossed-in-registration laminate system according to claim 18, wherein Wh, Wv and W are substantially equal.

20. The embossed-in-registration laminate system according to claim 18, wherein said first embossed-in-registration laminate includes a protective mat.

21. The embossed-in-registration laminate system according to claim 18, wherein said plurality of locking mechanisms comprise a tongue and groove system.

22. The embossed-in-registration laminate system according to claim 18, wherein said plurality of locking mechanisms comprise a snap-type system.

23. The embossed-in-registration laminate system according to claim 18, wherein the more than two of the embossed-in registration laminates are four embossed-in registration laminates.

24. The embossed-in-registration laminate system according to claim 18, wherein said plurality of embossed-in-registration laminates have a ceramic tile motif.

25. The embossed-in-registration laminate system according to claim 6, wherein at least two of the embossed-in-registration laminates are locked together and continue a pattern from one of the at least two of the embossed-in-registration laminates to another of the at least two of the embossed-in-registration laminates to complete a pattern from both a design point of view and an embossed-in-registration point of view.

26. The embossed-in-registration laminate system according to claim 25, wherein Wh, Wv and W are substantially equal.

27. The embossed-in-registration laminate system according to claim 25, wherein said first embossed-in-registration laminate includes a protective mat.

28. The embossed-in-registration laminate system according to claim 25, wherein said plurality of locking mechanisms comprise a tongue and groove system.

29. The embossed-in-registration laminate system according to claim 25, wherein said plurality of locking mechanisms comprise a snap-type system.

30. The embossed-in-registration laminate system according to claim 25, wherein said plurality of embossed-in-registration laminates have a ceramic tile motif.

* * * * *